United States Patent
Mead et al.

[11] 3,730,009
[45] May 1, 1973

[54] COMPOSITE DRIVE WHEEL

[75] Inventors: Robert H. Mead; George A. Zimmer, both of Ithaca, N.Y.

[73] Assignee: Borg-Warner Corporation, Chicago, Ill.

[22] Filed: Dec. 15, 1971

[21] Appl. No.: 208,495

Related U.S. Application Data

[63] Continuation of Ser. No. 884,094, Dec. 11, 1969, abandoned, which is a continuation-in-part of Ser. No. 678,831, Oct. 30, 1967, abandoned.

[52] U.S. Cl. .................. 74/243 R, 74/439, 74/461
[51] Int. Cl. ...... F16h 55/06, F16h 55/14, F16h 55/30
[58] Field of Search ............... 74/243 R, 439, 443, 74/460, 461

[56] References Cited

UNITED STATES PATENTS

| | | | |
|---|---|---|---|
| 322,667 | 7/1885 | Wilson | 74/461 |
| 1,771,370 | 7/1930 | Benge | 74/449 |
| 2,317,275 | 4/1943 | Kinzie | 74/434 |
| 2,720,119 | 10/1955 | Sherman | 74/460 |
| 3,076,352 | 2/1963 | Larsh | 74/443 |
| 3,199,364 | 8/1965 | Dew | 74/443 X |
| 3,216,267 | 11/1965 | Dolza | 74/243 X |
| 3,469,468 | 9/1969 | Cozzarin et al | 74/243 |

FOREIGN PATENTS OR APPLICATIONS

| | | | |
|---|---|---|---|
| 872,140 | 3/1953 | Germany | 74/460 |
| 954,332 | 4/1964 | Great Britain | 74/439 |
| 1,129,024 | 5/1962 | Germany | 74/443 |

*Primary Examiner*—Charles J. Myhre
*Assistant Examiner*—Thomas C. Perry
*Attorney*—Donald W. Banner et al.

[57] ABSTRACT

Composite drive wheel devices are disclosed herein to provide illustrations of this invention. These wheels include a stamped circular plate having tooth roots on the periphery thereof with a plastic toothed rim molded over the tooth roots.

5 Claims, 14 Drawing Figures

Patented May 1, 1973

INVENTORS
ROBERT H. MEAD
GEORGE A. ZIMMER

BY Aubrey L. Burgen
ATTORNEY

Patented May 1, 1973

INVENTORS
ROBERT H. MEAD
GEORGE A. ZIMMER

BY Aubrey L. Burgen
ATTORNEY

COMPOSITE DRIVE WHEEL

CROSS REFERENCE TO RELATED APPLICATIONS

This application is a continuation of copending application Ser. No. 884,094 filed Dec. 11, 1969, which, in turn, is a continuation in part of Ser. No. 678,831, filed Oct. 30, 1967, both of which are now abandoned.

SUMMARY OF THE INVENTION

This invention relates to a composite drive wheel device wherein a stamped plate comprises the wheel body. The plate has a tooth root flange ribbon secured on the periphery thereof to provide radially outwardly extending tooth roots. A plastic toothed rim is molded over the tooth roots and periphery of the plate to provide a composite metal and plastic drive wheel with metal reinforced plastic teeth. The plastic is held by the tooth root ribbon against peripheral, axial and radial movement with respect to the plate, and the tooth root ribbon provides respectively complemental structural support for the plastic rim teeth to transmit drive loads therethrough. A plate flange is provided to contribute to the support of the ribbon tooth roots and can extend to any desired axial direction either uniformly in both directions from the general plane of the plate or in an offset manner for specialized use.

Other advantages and novel aspects of the invention will become apparent upon the following detailed description, in conjunction with the accompanying drawing wherein.

Figure 1:
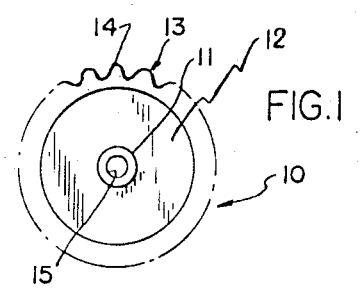
FIG. 1 is a general illustrative representation of the composite drive wheel device of this invention showing a stamped plate, flange, tooth root flange ribbon and plastic toothed drive rim.
Figure 8:
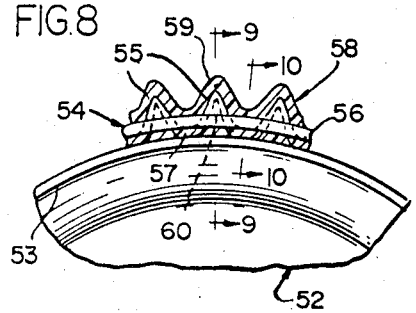
FIg. 8 is a partial view of a fourth embodiment of this invention showing an axially contoured tooth ribbon secured to a peripheral flange of a wheel plate.
Figure 9:
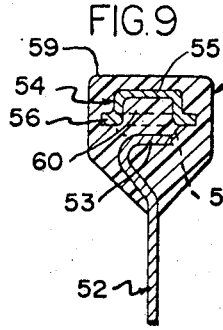
FIG. 9 is a partial sectional view taken along line 9—9 of FIG. 8 showing the axial contour of the ribbon at the tip of the teeth thereof.
Figure 10:
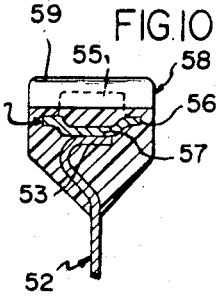
FIG. 10 is a partial sectional view taken along line 10—10 of FIG. 8 showing the axial contour of the ribbon between the teeth thereof.
Figure 11:
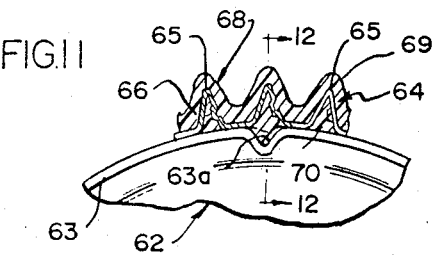
FIG. 11 is a partial view of a fifth embodiment of this invention showing a tooth ribbon having an embossed surface and secured to an axially grooved plate flange.
Figure 12:
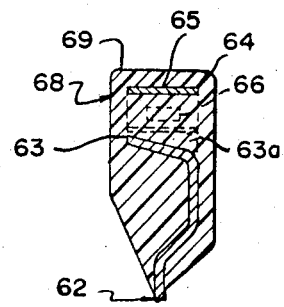
FIG. 12 is a partial sectional view taken along line 12—12 of FIG. 11 showing the axial shape of the ribbon and the plate flange.
Figure 13:
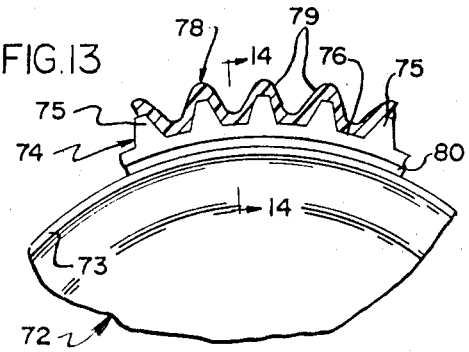
FIG. 13 is a partial view of a sixth embodiment of this invention showing a tooth ribbon rim secured to a peripheral flange of a wheel plate.
Figure 14:
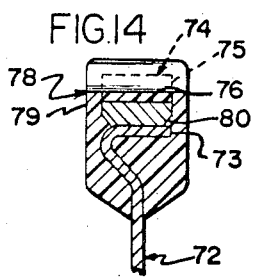
FIG. 14 is a partial sectional view taken along line 14—14 of FIG. 13 showing the axial position of the tooth ribbon rim on the flange plate.

A composite sprocket and gear drive wheel generally represented by the numeral 10 is shown in FIG. 1 along with various embodiments thereof (FIGS. 2-14) for the purpose of illustrating and describing this invention. The composite sprocket includes generally, among other things, a hub 11, a stamped plate web 12, tooth root flange ribbon 13 and a plastic toothed rim 14. The hub 11 is secured to the stamped plate web 12 and is adapted with an aperture 15 to drivingly receive a drive or driven shaft.

Figure 3:
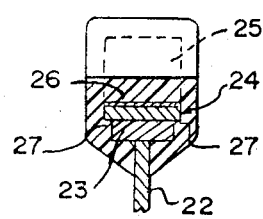
FIG. 3 is a partial sectional view taken along line 3—3 of FIG. 2 showing the axially balanced arrangement.
Figure 2:
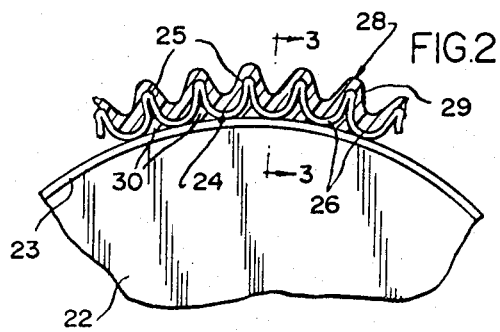
FIG. 2 is a partial view of a first embodiment of this invention showing a tooth root ribbon secured to an axially balanced peripheral plate flange with the plastic drive transmitting rim molded therewith.

In the first embodiment of the invention (FIGS. 2 and 3), a stamped plate 22 is provided with a plate flange 23 that is axially symmetrically positioned with respect to the periphery of the plate 22 (FIG. 3). A corrugated tooth root flange ribbon 24 is positioned on the plate flange 23. The ribbon 24 has radially outwardly extending portions 25 to provide sprocket type tooth roots. The ribbon 24 further has inner curved portions 26 to provide a contact for securing the ribbon 24 to the flange 23 by welds or similar means 27.

A plastic toothed rim 28 is molded over the plate flange 23, ribbon 24 and outer periphery of the plate 22 so that teeth 29 thereof are respectively formed in complemental spaced relationship with the projecting portions 25 of the ribbon 24. The ribbon portions 25 act to support and strengthen the plastic teeth 29 of the rim 28. It should be noted that the plastic of the molded rim 28 can be forced by the molding thereof to enter in and around spaces 30 between the flange 23 and the projections 25 of the ribbon 24, as well as the outer surface of the ribbon 24 and the inner surface of the flange 25. The rim 24 will thereby be held against axial, radial and peripheral movement with respect to the plate 22, flange 23 and ribbon 24.

Figure 5:
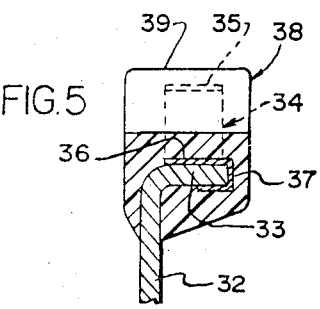
FIG. 5 is a partial sectional view taken along line 5—5 of FIG. 4 showing the open shape of the clips used to secure the ribbon to the axially offset flange.
Figure 4:
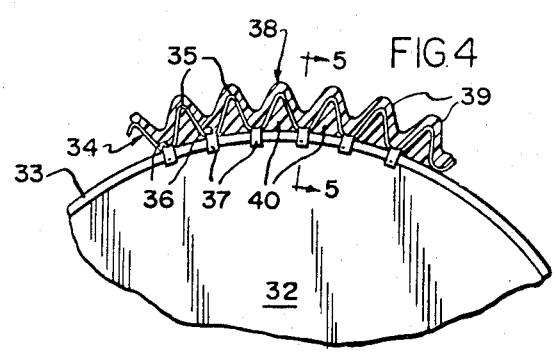
FIG. 4 is a partial view of a second embodiment of this invention showing a tooth root ribbon secured to an axially offset peripheral flange of a wheel plate by open ribbon clips.

In the second embodiment of the invention (FIGS. 4 and 5), a stamped plate 32 is provided with a plate flange 33 that is axially offset in one direction and is positioned at the periphery of the plate 32 (FIG. 5). A corrugated tooth root flange ribbon 34 is positioned on the flange 33. The ribbon 34 has outwardly extending portions 35 to provide gear-tooth type tooth roots. The ribbon 34 further has inner curved portions 36 to provide a contact for frictionally securing the ribbon 34 to the flange 33 by the channel clips or similar means 37.

A plastic toothed rim 38 is molded over the flange 33, ribbon 34 and outer periphery of the plate 32 so that teeth 39 thereof are respectively formed in complementally spaced relationship with the projecting portions 35 of the ribbon 34. The ribbon portions 35 act to support and strengthen the plastic teeth 39 of the rim 38. It should be noted that the plastic of the molded rim 38 can be forced by the molding thereof to enter in and around spaces 40 between the flange 33 and the projections 35 of the ribbon 34, as well as the outer surface of the ribbon 34 and the inner surface of the flange 35. The rim 34 will thereby be held against axial, radial and peripheral movement with respect to the plate 32, flange 33 and ribbon 34.

Figure 7:
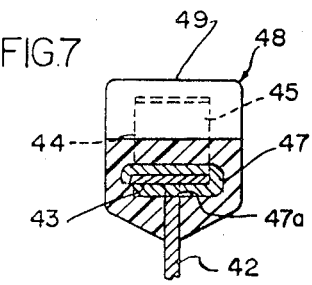
FIG. 7 is a partial sectional view taken along line 7—7 of FIG. 6 showing the closed shape of the ribbon clips used to secure the ribbon to the axially centered flange.
Figure 6:
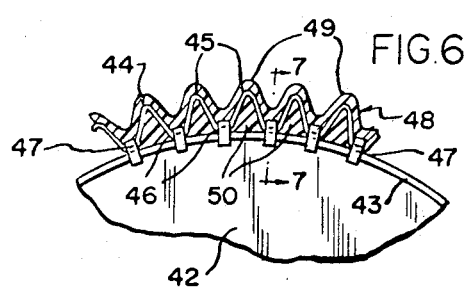
FIG. 6 is a partial view of a third embodiment of this invention showing a tooth root ribbon secured to an axially balanced peripheral flange of a wheel plate by closed ribbon clips.

In the third embodiment of this invention (FIGS. 6 and 7), a stamped plate 42 is provided with a plate flange 43 that is axially symmetrically positioned with respect to the periphery of the plate 42 (FIG. 7). A corrugated tooth root flange ribbon 44 is positioned on the plate flange 43. The ribbon 44 has radially outwardly extending portions 45 to provide gear-toothed type tooth roots. The ribbon 44 further has inner curved portions 46 to provide a contact for securing the ribbon 44 to the flange 43 by the encircling retainer clips or similar means 47 inserted through openings 47a of the plate 42 adjacent the flange 43.

A plastic toothed rim 48 is molded over the flange 43, ribbon 44 and outer periphery of the plate 42 so that teeth 49 thereof are formed in respective complementally spaced relationship with the projection portions 45 of the ribbon 44. The ribbon portions 45 act to support and strengthen the plastic teeth 49 of the rim 48. It should be noted that the plastic of the molded rim 48 can be forced by the molding thereof to enter in and around spaces 50 between the flange 43 and the projections 45 of the ribbon 44, as well as the outer surface of the ribbon 44 and the inner surface of the flange 45. The rim 44 will thereby be held against axial, radial, and peripheral movement with respect to the plate 42, flange 43 and ribbon 44.

In the fourth embodiment of this invention (FIGS. 8–10), a stamped plate 52 is provided with a flange 53 on the periphery thereof. A corrugated and axially contoured tooth root flange ribbon 54 is positioned on the plate flange 53. The ribbon 54 has radially outwardly extending portions 55 to provide gear tooth type tooth roots. The ribbon 54 further has axially extending rib portions 56 and inwardly extending base portions 57 secured by welds or similar means to the plate flange 53 which strengthen the ribbon 54.

A plastic tooth rim 58 is molded over the plate flange 53, ribbon 54 and outer periphery of the plate 52 so that teeth 59 thereof are formed in respective complementally spaced relationship with the projection portions 55 of the ribbon 54. The ribbon portions 55 act to support and strengthen the plastic teeth 59 of the rim 58. It should be noted that the plastic of the molded rim 58 can be forced by the molding thereof to enter in and around spaces 60 between the plate flange 53 and the projections 55 of the ribbon 54, as well as the outer surface of the ribbon 54 and the inner surface of the flange 55. The rim 54 will thereby be held against axial, radial, and peripheral movement with respect to the plate 52, flange 53 and ribbon 54.

In the fifth embodiment of this invention (FIGS. 11 and 12), the stamped plate 62 is provided with a plate flange 63 which is provided with axially tapered indentations 63a at spaced circumferential distances on the plate flange 63. A corrugated tooth root flange ribbon 64 is positioned and secured as by welds or similar means on the plate flange 63 with the tapered indentations 63a adjacent radially outwardly extending portions 65 of the ribbon 64. The extending portions 65 provide gear tooth type tooth roots. The ribbon 64 further has embossments 66 in a face of the extending portions 65 thereof.

A plastic tooth rim 68 is molded over the plate flange 63, ribbon 64 and outer periphery of the plate 62 so that teeth 69 thereof are formed in respective complementally spaced relationship with the projection portions 65 of the ribbon 64. The ribbon portions 65 act to support and strengthen the plastic teeth 69 of the rim 68. It should be noted that the plastic of the molded rim 68 can be forced by the molding thereof to enter in and around spaces 70 between the plate flange 63 and the projections 65 of the ribbon 64, as well as the outer surface of the ribbon 64 and the inner surface of the flange 65. The rim 64 will thereby be held against axial, radial, and peripheral movement with respect to the plate 62, flange 63 and ribbon 64.

In the sixth embodiment of this invention (FIGS. 13 and 14), a stamped plate 72 is provided with a plate flange 73 on the periphery thereof. A tooth root flange ribbon rim 74 cut from a length of a formed ribbon is positioned and secured, as by welds or similar means, on the flange 73 and is provided with outwardly extending portions 75 to provide gear tooth type tooth roots. The rim 74 further has inner portions 76.

A plastic tooth rim 78 is molded over the plate flange 73, ribbon 74 and outer periphery of the plate 72 so that teeth 79 thereof are formed in respective complementally spaced relationship with the projecting portions 75 of the ribbon 74. The ribbon portions 75 act to support and strengthen the plastic teeth 79 of the rim 78. It should be noted that the plastic of the molded rim 78 can be forced by the molding thereof to enter in and around spaces 80 between the flange 73 and the projections 74 75 the ribbon 74, as well as the outer surface 76 of the ribbon rim 74 and the inner surface of the flange 75. The rim 74 will thereby be held against axial, radial, and peripheral movement with respect to the plate 72, flange 73 and ribbon 74.

It is to be understood that the invention is not to be limited to the specific constructions and arrangements shown and described, as it will be understood to those skilled in the art that changes may be made without departing from the principles of the invention.

What is claimed is:

1. A composite drive wheel device comprising a drive wheel plate, having an arcuate periphery and a peripheral flange, the outer portion of said flange extending through the plane of the drive wheel plate, a separate tooth root flange ribbon, said tooth root ribbon being corrugated and axially open with alternate radially outwardly extending tooth roots and radially inwardly extending portions, said radially inwardly extending portions being secured to the peripheral flange of said plate, and a plastic rim secured on said tooth root flange ribbon and to said outer portion of said flange, said plastic rim having radially outwardly extending teeth respectively and complementally positioned over and around the teeth of said tooth root flange ribbon.

2. A composite drive wheel device as defined in claim 1 wherein said ribbon is frictionally secured to said plate flange by open channel clips frictionally positioned over said plate flange and said inner portions of said ribbon.

3. A composite drive wheel device as defined in claim 1 wherein said ribbon is secured to said peripheral plate flange by encircling clips positioned around said plate flange and said inner portion of said ribbon.

4. A composite drive wheel device as defined in claim 1 wherein said peripheral plate flange is provided with axially tapered indentations adjacent said radially outwardly extending portions of said ribbon.

5. A composite drive wheel device as defined in claim 1 wherein said radially outwardly extending tooth roots of said ribbon are provided with embossments on an extending surface thereof to aid in the retention of the plastic rim.

* * * * *